United States Patent [19]

Head

[11] 3,990,739
[45] Nov. 9, 1976

[54] DOOR CONTROL MECHANISM

[75] Inventor: Glenn Dale Head, Des Moines, Iowa

[73] Assignee: Deere & Company, Moline, Ill.

[22] Filed: Feb. 27, 1975

[21] Appl. No.: 553,743

[52] U.S. Cl. .................................. 296/56; 49/255; 49/281; 298/23 S
[51] Int. Cl.² ........................................ B62D 25/00
[58] Field of Search ............ 296/56, 50, 28 D, 106; 298/23 R, 23 MD, 23 M, 23 S, 23 A, 23 B, 23 F, 23 D, 23 DF, 38, 22 J; 49/255, 279, 280, 281; 74/607; 56/346, 350, 361

[56] References Cited
UNITED STATES PATENTS

| | | |
|---|---|---|
| 3,325,216 | 6/1967 | Boeck .......................... 298/23 MD |
| 3,440,764 | 4/1969 | Cover .......................... 296/56 X |
| 3,691,741 | 9/1972 | White et al. ..................... 56/346 X |
| 3,757,969 | 9/1973 | Smith .......................... 296/56 |
| 3,830,542 | 8/1974 | Lablanche ..................... 295/56 |
| 3,873,149 | 3/1975 | Churchman .................... 296/56 |
| 3,904,049 | 9/1975 | Prahst .......................... 298/23 S X |

*Primary Examiner*—Robert G. Sheridan
*Assistant Examiner*—Randolph A. Reese

[57] ABSTRACT

A rear door control mechanism for a stack-forming implement having a compressor roof first raises the door vertically to unlatch it and then rotates the door about an elevated and horizontally transverse axis to permit stack unloading. The door control mechanism functions independently of the compression roof and other wagons' mechanical systems and assures positive door unlatching before the opening mechanism attempts to open the door.

4 Claims, 5 Drawing Figures

DOOR CONTROL MECHANISM

BACKGROUND OF THE INVENTION

The present invention relates generally to a mobile hay stack-forming machine and more particularly to a control mechanism for opening and closing the door on such a machine.

It is old in the art for stack wagons having vertically reciprocable roofs to utilize the roof movement to unlatch and open and then close and latch their stack discharge doors. See, for example, the U.S. Pat. No. 3,901,142, granted Aug. 26, 1975 and assigned to Deere & Company, wherein both latch movement and door movement are controlled by compressor roof movement. Other examples wherein latch movement is manually controlled and door movement is dependent upon roof movement are disclosed in U.S. Pat. No. 3,691,741 issued Sept. 19, 1972 to White et al., and U.S. Pat. No. 3,732,672 issued May 15, 1973 to Adee et al.

When a door latch must be manually released after a stack has been formed, the back pressure on the door exerted by the compressed stack often makes unlatching extremely difficult. When the unlatching control is integrally part of the door opening control, then failure of the latch to release can cause substantial damage to both the door and the crop-receiving body as the door opening control attempts to open a latched door.

An additional problem encountered with mechanical unlatching and door opening mechanisms similar to those available in the prior art arises as a result of the dust, dirt and foreign matter which accumulates in the springs, housing and channels of the mechanism. Manual unlatching and latching become difficult if not impossible unless this material is removed and unlatching even by mechanical means can be unreliable due to the compressed stack back pressure and foreign matter interference with latch clearances.

Accordingly, applicant has provided a door control mechansim which is neither manually unlatched nor latched, and is not dependently coupled with another operation of the stack wagon cycle. Neither does applicant's unlatching mechansim contain any channels, nor other dust and dirt gathering recesses which would fill with foreign matter to retard unlatching operation. In this manner, applicant has provided for positive opening of the latch prior to opening of the door and for opening of the door independently of roof position or movement.

SUMMARY OF THE INVENTION

In his application, applicant has disclosed a door opening mechanism which first raises the door vertically to unlatch the door, and then vertically swings and raises the door about a transverse axis to permit unloading of the formed stack.

It is therefore an object of the present invention to provide a door opening mechanism which positively unlatches before the door opening mechanism is engaged.

As part of this object, it is desired to provide a door opening mechanism which is unlatched without manual assistance.

To assure that unlatching does occur, it is another object to provide a door opening mechanism wherein the latch mechanism is simple and reliable and will not malfunction because of dust, dirt or foreign matter accumulations.

It is yet another object to provide a door opening mechanism which is mechanically operated and will open regardless of any back pressures which may be exerted on the door by the compressed crop material.

Yet another object is to provide a door opening mechanism which operates independently of the compressor roof or other stack wagon system and is therefore operatively dependable irrespective of the roof's position and other wagon systems.

Yet another object is to provide a door opening mechanism wherein the door will positively maintain any position of openness and not descend until so operated.

And yet another object of this invention is to provide a door control mechanism which is reliably operative by the operator from his cab, and is simple requiring only minimum maintenance.

DESCRIPTION OF THE PREFERRED EMBODIMENT

In the following description, right-hand and left-hand reference is determined by standing at the rear of the implement and facing the direction of travel.

Figure 1:
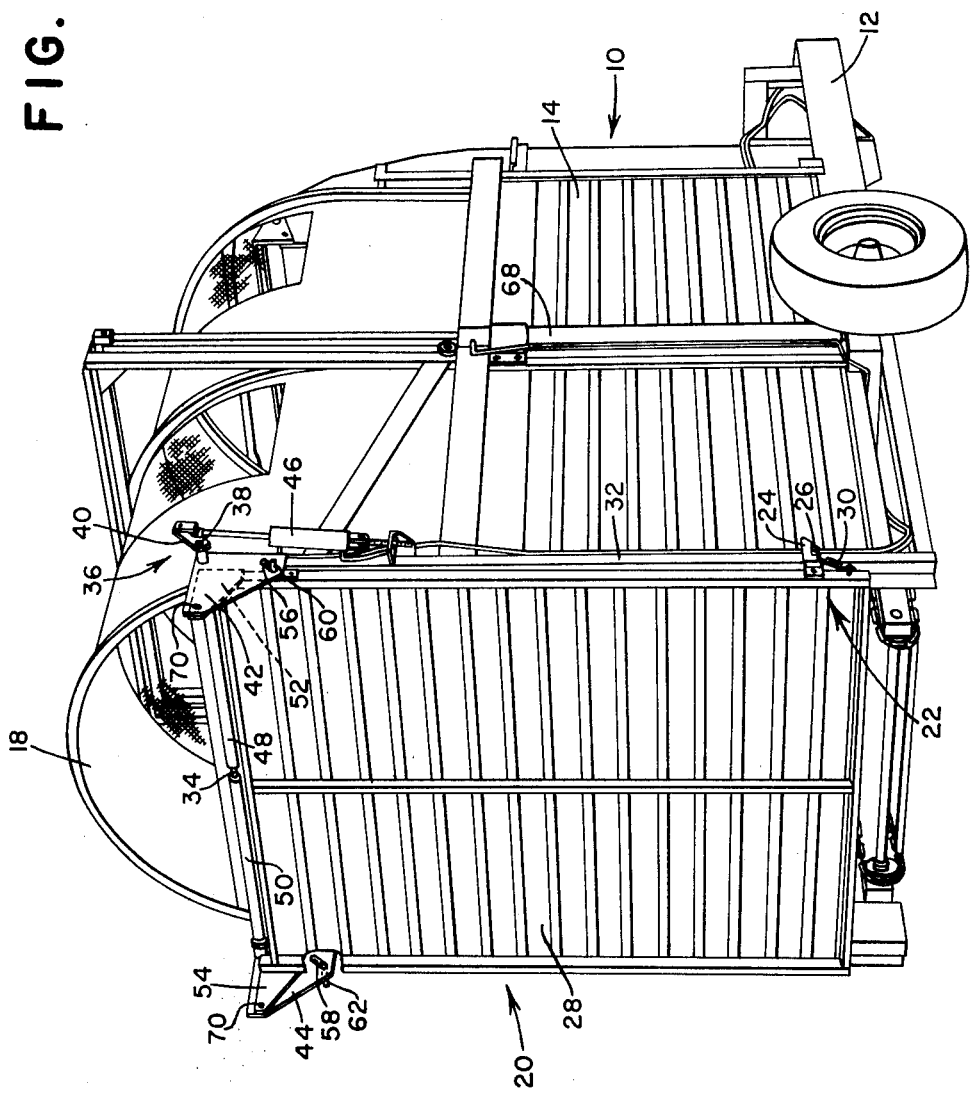
FIG. 1 is a rear perspective view of a stack-forming machine embodying the invention thereon.
Figure 2:
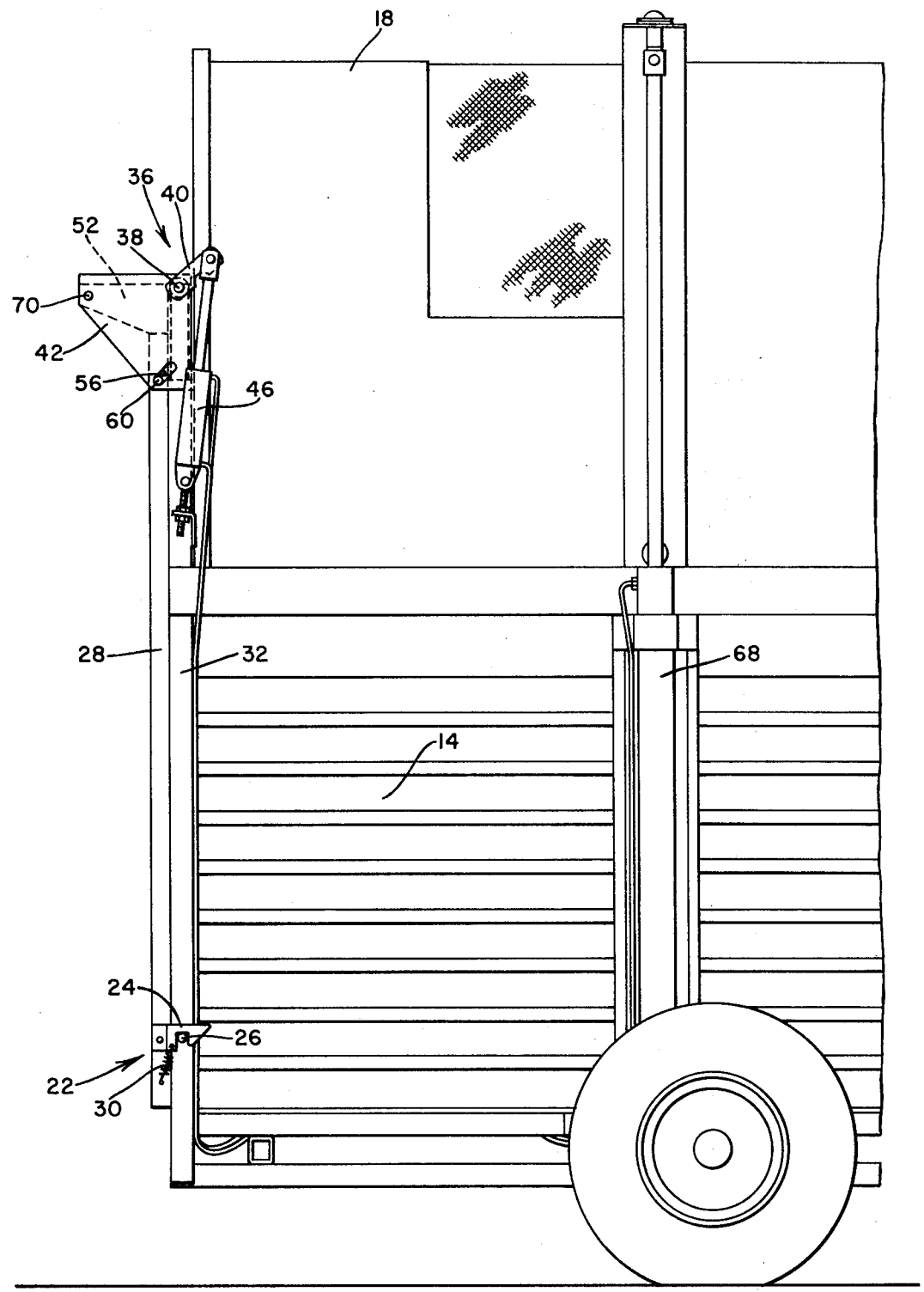
FIG. 2 is a side view of the door control mechanism when the door is in a latched and closed position.
Figure 3:
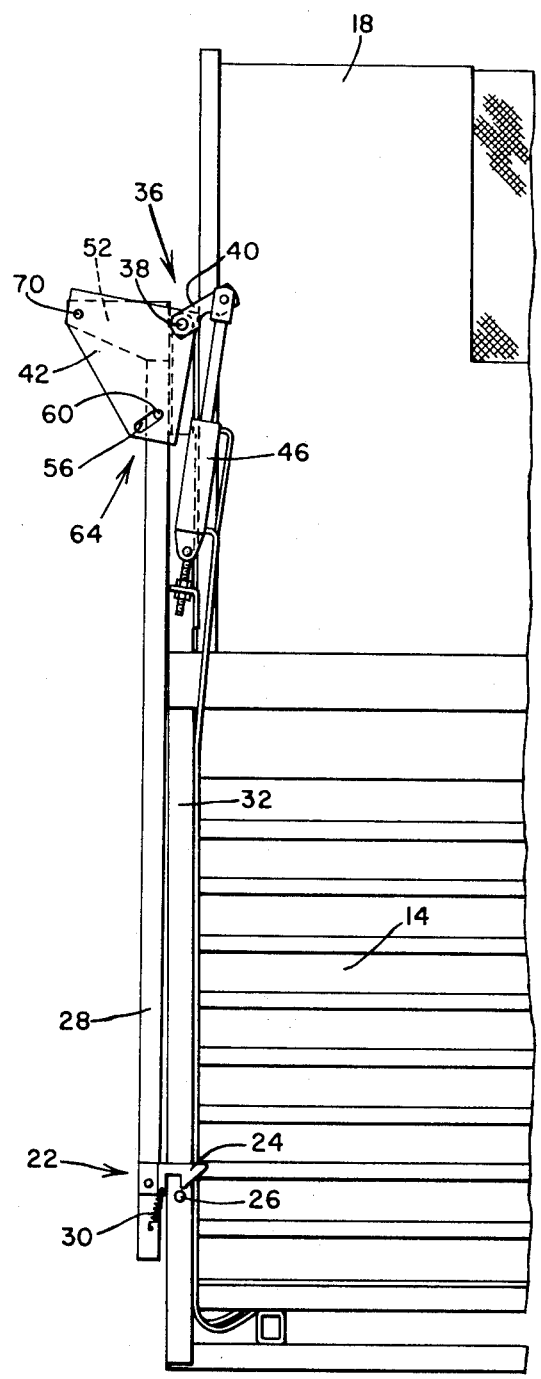
FIG. 3 is a side elevation view similar to FIG. 2, but illustrating the door control mechanism when the door is in an unlatched and closed position.
Figure 4:
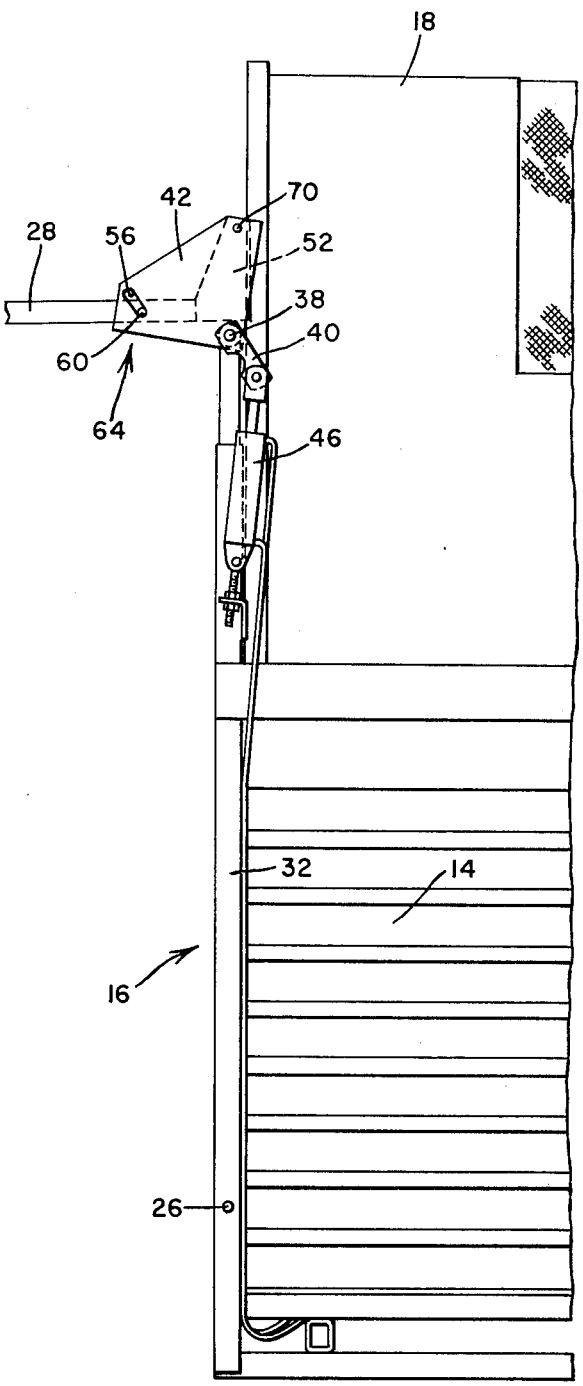
FIG. 4 is a side elevation view similar to FIG. 2, but illustrating the door control mechanism when the door is in an opened position.

Referring now to the drawings, there is disclosed in FIG. 1 a mobile stack-forming implement 10 having a main frame 12, a crop-receiving body 14 including an open end 16 through which a completed stack can pass, a vertically shiftable compressor roof 18 or canopy, and a door structure 20 including a door member for the open end.

The improved door control mechanism as illustrated includes means to both latch or unlatch and open and close the door member.

The latching or retaining means 22 includes a hooked latch member 24 pivotally attached to the lower portion of the door structure 20 and extending forwardly therefrom. A latch pin 26 extends out from the body 14 and is matingly engaged by the hooked latch member 24 to retain the door 28 in a closed position with the body 14. A biasing spring 30 is secured between the hooked latch member 24 and the door structure 20 to exert a downward force on the latch member 24 and retain it in an engaged position with the body pin 26. A stop, not shown, prevents the hooked latch member from rotating downwardly beyond a horizontal position.

The crop-receiving body 14 includes, adjacent its open end portion and on each side thereof, a vertically extending member 32. Supported at each end by the member 32 is a horizontal and transverse cross shaft 34. A lever means 36 or bell crank means is secured at the right end of the cross shaft 34 for vertical swinging movement about the cross shaft axis 38. This lever means 36, as illustrated on the current embodiment, includes a first lever arm 40 extending forwardly and second lever arms 42 and 44 extending rearwardly from the cross shaft axis 38. A powered means or hydraulic cylinder 46 has its base end secured with the crop-receiving body 14 and its rod end pivotally secured with the forward end of the lever means 36. Upon extension or retraction, the hydraulic cylinder 46 will swingably move the first lever arm 40 of the lever means through a vertical arc to rotate the cross shaft 34.

As illustrated, the invention utilizes a torque-transmitting pair of cross shaft sleeves 48 and 50, positioned exterior to and coaxial with the cross shaft 34. Each sleeve 48 and 50 is secured to the cross shaft at the shaft's 34 center portion only and extends from the cross shaft center portion transversely along the cross shaft 34 to the end portions of the shaft 34. One second lever arm 42 is secured to the right cross shaft sleeve 48 just inwardly of the first lever arm 40. An identical second lever arm 44 is secured to the outer end of the left cross shaft sleeve 50. As does the first lever arm 40, the second lever arms 42 and 44 extend from the cross shaft axis of rotation 38 for vertical swinging movement about the cross shaft transverse axis 38.

The second lever arms 42 ad 44 are of generally triangular shape and extend rearwardly from their respective cross shaft sleeves 48 and 50. Lateraly removed and rearwardly of the cross shaft axis 38 are pivotally supported on each second lever arm, a door lift member designated respectively 52 and 54. Each door lift member 52 and 54 is supported on the door 28 and extends rearwardly therefrom.

Each second lever arm 42 and 44 has a slotted opening 56 and 58 in the lower portion through which their respective door mounted pins 60 and 62 extend. This lost motion abutment means between the door structure 20 and lever means 36 is identified generally by the number 64.

Figure 5:
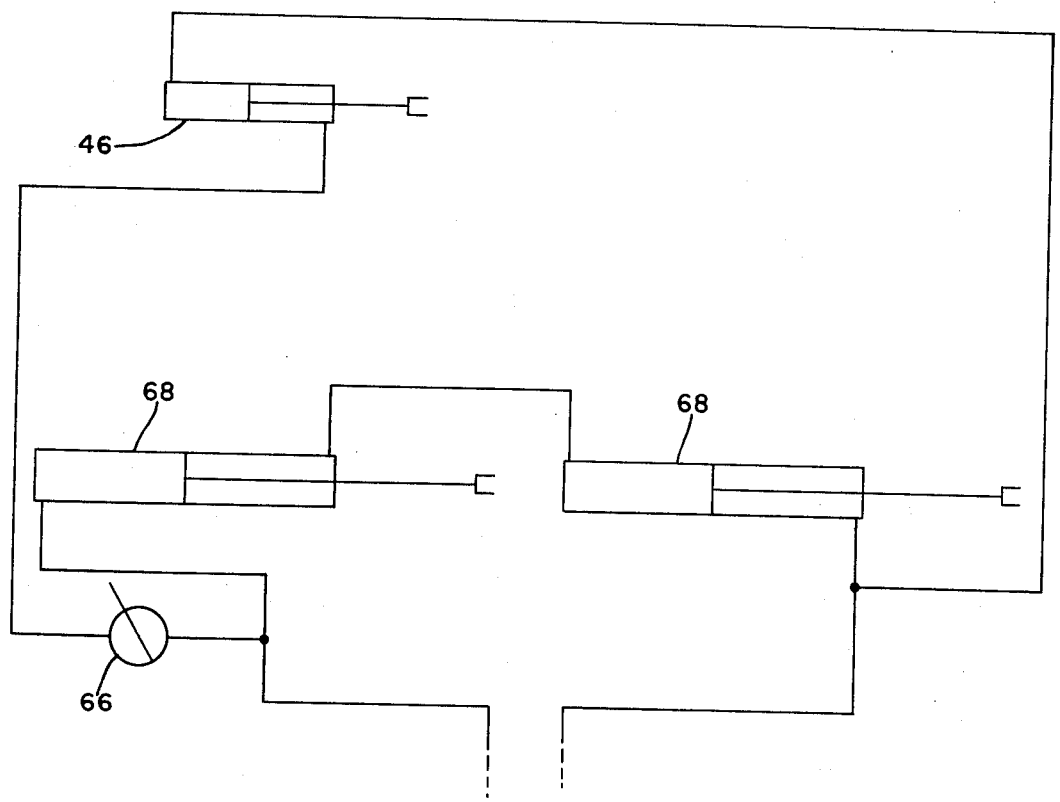
FIG. 5 is a schematic illustration of the hydraulic system for the compressor roof cylinders and the door control hydraulic cylinder illustrating the parallel hydraulic line configuration and the hydraulic system lock.

The operation of the above-described door control mechanism is as follows. Upon completing a stack, the operator will open the hydraulic lock 66 (see FIG. 5), which has isolated the hydraulic system of the door control mechanism from the canopy lift hydraulic system and cylinders 68, and then activate the hydraulic fluid pump. FIG. 5 illustrates the two parallel hydraulic systems and the lock 66. As fluid flows to the powered means or hydraulic cylinder 46, the rod end will retract and swingably move the lever means 36, which includes the first lever arm 40 and second lever arms 42 and 44, through vertical arcs.

Unless a hydraulic cylinder were provided at each end of the cross shaft 34, unequal torque forces would be encountered at each end of the cross shaft 34 as the single hydraulic cylinder rotated the cross shaft to in turn rotate each second lever arm 42 and 44. To eliminate the necessity of providing a hydraulic cylinder on each side of the body 14, a torque transfer means utilizing center-connected cross shaft sleeves 48 and 50 is provided. As the single hydraulic cylinder 46 rod end thus rotates the first lever arm 40, the resulting rotational force is transferred to the cross shaft 34. With the sleeves 48 and 50 secured to the cross shaft 34 only at the shaft center portion, balanced torque forces are encountered in the shaft 34 and the sleeves 48 and 50 in turn transfer the torque forces outwardly along the sleeves and to each second lever arm 42 ad 44. In effect the first lever arm 40 and second lever arms 42 and 44 thus function as a bell crank means.

As the second lever arms 42 and 44 are rotated upwardly, the means pivotally interconnecting 70 the door structure and the lever arms 42 and 44 rotates about the cross shaft axis 38. Pivotally interconnected with each second lever arm 42 and 44 and forming part of the door structure are lift members respectively designated 52 and 54. As the second lever arms are rotated upwardly, the pivotal interconnections 70 and lift members 52 and 54 initially move in a generally linear and vertical path. During this portion of the lever means rotation the door 28 is lifted vertically to unlatch the latch means 22. As each second lever arm 42 and 44 is thus rotated, the slotted openings 56 and 58 will first move over the pins 60 and 62 and then continue along their respective upwardly swinging arcs to engageably contact their respective pins at the forward inside edge of each slotted openings 56 and 58. After the pins have abutted the forward inside edge of their respective slotted openings, the door 28 will be rotated about the cross shaft axis 38 as supported by the pivotal interconnecting means 70 and the lost motion connection means 64. When the hydraulic cylinder rod has fully retracted, the door 28 will be opened such that the completed stack can be removed. To assure that the door will remain in this opened position and not slowly descend during unloading, the hydraulic line lock 66 is activated.

After the stack is unloaded, the operator opens the lock and reverses the hydraulic line fluid flow. The hydraulic cylinder rod will extend causing the first lever arm 40 to rotate rearwardly permitting the door to lower. As the door closes against the open end of the body, the pins 60 and 62 in the slotted openings 56 and 58 will abut against the rearward walls of their respective slots 56 and 58. As the second lever arms 42 and 44 are rotated rearwardly further, the pressure exerted against the pins 60 and 62 by the rearward walls of the slots 56 and 58 will force the door forward against the crop-receiving body. In a reversed fashion, the door 28 will then be lowered vertically permitting the latch members 22 to be lowered onto the body mounted pins 26 to retain the door in a closed position.

I claim:

1. In a stack forming implement with a mobile crop-receiving body and having a verticaly reciprocable compressor roof on the body for compressing the received crop, an open end through which a completed stack can pass and a door structure for said open end, an improved door control mechanism comprising: a first lever arm mounted on a transverse cross shaft supported on the body and extending across the open end thereof; a cross shaft sleeve coaxial with the shaft and secured to the center portion of the shaft only extending therefrom to one end portion of the shaft; a second lever arm secured to the cross shaft sleeve end portion; powered means connected between the body and the first lever arm for swingably moving said lever arm through a vertical arc; means pivotally suspending the door structure from the second lever arm, rearwardly offset from the axis of rotation of the second lever arm and responsive upon swinging movement of said lever arms to move the door structure vertically;

latch means acting between the body and door structure to prevent movement of the door structure from a closed position, and responsive to upward movement of the door structure to unlatch the door structure; and abutment means secured to the door structure, offset from the second lever arm axis of rotation, engageable with the second lever arm after the door structure is unlatched to thereafter rotatably swing the door structure as the first lever arm is moved by the powered means.

2. In a stack-forming implement with a mobile crop-receiving body having an open end through which a completed stack can pass and a door structure for said open end, a door control mechanism comprising: a horizontally transverse cross shaft, supported on the body and extending across the open end thereof; a pair of cross shaft sleeves, exterior to and coaxial with the cross shaft, each sleeve secured to the cross shaft at the shaft's center portion only and extending outwardly therefrom to the end portion of said shaft; a first lever arm secured to and extending forwardly from the cross shaft for swinging movement about a transverse axis; a second lever arm mounted on the outward portion of a sleeve and extending rearwardly therefrom for swinging movement about a transverse axis; powered means acting between the body and the first lever arm means to swingaby move said lever arm through a vertical arc; means pivotally interconnecting the second lever arm and the door structure for relative movement about the second lever arm transverse axis to support said door structure and effect generally vertical movement of the door structure upon swinging movement of the second lever arm; latch means acting between the body and door structure to prevent movement of the door structure from a closed position, and responsive to upward movement of the door structure to become unlatched; and means engageable between the door structure and second lever arm, including a lost motion abutment means to vertically adjust the door structure a predetermined distance for latching and unlatching the latch means and for shifting the door structure about the second lever arm axis when the latch means is unlatched.

3. In a stack-forming implement with a mobile crop-receiving body having an open end through which a completed stack can pass and door for said open end, a door control mechanism comprising: a horizontally transverse cross shaft supported on the body and extending across the open end thereof; a pair of cross shaft sleeves exterior to and coaxial with the cross shaft, each sleeve secured to the cross shaft at the shaft's center portion only and extending outwardly therefrom to the end portion of said shaft; a first lever arm secured to and extending forwardly from said cross shaft; a second lever arm mounted on a sleeve; a lift member supported on the door; means pivotally interconnecting the second lever arm and the lift member offset from the transverse cross shaft to support said door and effect generally vertical movement of the door upon swinging movement of said second lever arm; powered means acting between the body and the first lever arm; latch means acting between the body and door to prevent movement of the door from its closed position, and responsive to upward movement of the door to become unlatched; and means engageable between the door structure and lever means, including a lost motion abutment means comprised of a slotted opening in the second lever arm and a transversely projecting pin secured to and extending from the door and passing through the slotted opening for permitting vertical adjustment of the door of a predetermined distance for latching and unlatching the latch means and for shifting the door about the second lever arm axis when the latch means is unlatched.

4. In a stack forming implement with a mobile crop-receiving body having an open end through which a completed stack can pass, the improvement comprising: a door disposed in an initial generally upright position closing the open end of the body and arranged for limited substantially linear movement between up and down positions; retaining means engageable directly between the door and body when the door is in its downward position and separable to enable upward movement of the door to its up position; a transverse cross shaft supported by the body adjacent the open end thereof and including a cross shaft sleeve coaxial with said shaft, connected to the shaft at the midportion thereof and extending there from to one end of said shaft; first and second lever means connected to the shaft and sleeve and rockable about a transverse axis, the first lever means extending forwardly from said axis and the second lever means extending rearwardly from said axis; power means connected between the body and the first lever means for raising said lever means in a door opening phase to cause the second lever means to travel in an upward and forward arc, and in a reverse door closing phase; means interconnecting the second lever means and the door for raising the door bodily upwardly to separate the retaining means during the upward part of the door opening phase, and for carrying the door during the remainder of said phase; and means engageable betwen the door and the second lever means for engaging the door subsequent to separation of the retaining means for swinging the door about the aforesaid axis.

* * * * *